(12) United States Patent
Futaki et al.

(10) Patent No.: US 11,109,286 B2
(45) Date of Patent: Aug. 31, 2021

(54) RADIO TERMINAL, BASE STATION, AND METHODS AND NON-TRANSITORY COMPUTER-READABLE MEDIA THEREFOR

(71) Applicant: NEC CORPORATION, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 12 days.

(21) Appl. No.: 16/473,299

(22) PCT Filed: Nov. 21, 2017

(86) PCT No.: PCT/JP2017/041820
§ 371 (c)(1),
(2) Date: Jun. 25, 2019

(87) PCT Pub. No.: WO2018/128018
PCT Pub. Date: Jul. 12, 2018

(65) Prior Publication Data
US 2019/0342804 A1    Nov. 7, 2019

(30) Foreign Application Priority Data

Jan. 5, 2017 (JP) .............................. JP2017-000802

(51) Int. Cl.
*H04W 36/00* (2009.01)
*H04W 76/27* (2018.01)
*H04W 36/14* (2009.01)
*H04W 84/04* (2009.01)
*H04W 88/06* (2009.01)

(52) U.S. Cl.
CPC ....... *H04W 36/0069* (2018.08); *H04W 36/14* (2013.01); *H04W 76/27* (2018.02); *H04W 84/042* (2013.01); *H04W 88/06* (2013.01)

(58) Field of Classification Search
None
See application file for complete search history.

(56) References Cited

PUBLICATIONS

Communication dated Oct. 23, 2019 from the European Patent Office in application No. 17890706.9.
NTT Docomo, Inc., "UE state transition diagram for NR", 3GPP TSG-RAN WG2 #95bis, R2-167136, 2016, pp. 1-8.
CATT, "Inter-RAT mobility support in inactive state", 3GPP TSG-RAM WG2 Meeting #96, R2-167964, 2016, pp. 1-2.
LG Electronics, Inc., "SI Validity for broadcast SI and on-demand SI", 3GPP TSG-RAN WG2 #96, R2-168417, 2016, pp. 1-2.
"Overview of the NR RRC state machine and modelling of the INACTIVE state", Samsung, 3GPP TSG-RAN WG2 Meeting #96, R2-167493, Nov. 14-18, 2016, pp. 1-4, Reno, USA.
"Skeleton report", ETSI MCC, 3GPP TSG-RAN WG2 Meeting #96, Nov. 14-18, 2016, pp. 1-6, Reno, USA.

(Continued)

*Primary Examiner* — Willie J Daniel, Jr.
(74) *Attorney, Agent, or Firm* — Sughrue Mion, PLLC

(57) ABSTRACT

When a radio terminal (2) in a first RAT RRC_INACTIVE state in the first radio access network (RAN) (3) and having a Non-Access Stratum (NAS) connection with a first core network (CN) (4) associated with the first RAT moves to a cell (51) of a second RAN (6), the radio terminal (2) alters an RRC state transition operation of the radio terminal (2) depending on whether the second RAN (6) supports inter-working with at least one of the first CN (4) and the first RAN (3).

13 Claims, 11 Drawing Sheets

(56) References Cited

PUBLICATIONS

"Further consideration on the new RAN controlled state in NR", ZTE, ZTE Microelectronics, 3GPP TSG-RAN WG2 Meeting #95bis, R2-166611, pp. 1-4, Oct. 10-14, 2016, Kaohsiung.

"UE state transition diagram for NR", NTT Docomo, Inc., 3GPP TSG-RAN WG2 #96, R2-168077, pp. 1-7, Nov. 14-18, 2016, Reno, USA.

"LTE and NR interaction for configuration coordination", Intel Corporation, 3GPP TSG-RAN WG2 Meeting #96, R2-168507, pp. 1-5, Nov. 14-18, 2016, Reno, USA.

3GPP TR 23.799 V14.0.0, "3rd Generation Partnership Project; Technical Specification Group Services and System Aspects; Study on Architecture for Next Generation System (Release 14)", Dec. 2016, pp. 1-522.

International Search Report of PCT/JP2017/041820 dated Feb. 6, 2018 [PCT/ISA/210].

RADIO TERMINAL, BASE STATION, AND METHODS AND NON-TRANSITORY COMPUTER-READABLE MEDIA THEREFOR

CROSS REFERENCE TO RELATED APPLICATIONS

This application is a National Stage of International Application No. PCT/JP2017/041820, filed Nov. 21, 2017, claiming priority to Japanese Patent Application No. 2017-000802, filed Jan. 5, 2017, the contents of all of which are incorporated herein by reference in their entirety.

TECHNICAL FIELD

The present disclosure relates to a radio communication system and, in particular, to reselection or handover between different Radio Access Technologies (RATs).

BACKGROUND ART

The 3rd Generation Partnership Project (3GPP) has started in 2016 the standardization for the fifth generation mobile communication system (5G), i.e., 3GPP Release 14, to make it a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NG RAN). A new base station in the NG-RAN is referred to as a NR NodeB (NR NB) or a gNodeB (gNB). A new core network for the 5G System is referred to as a 5G Core Network (5G-CN) or a NextGen Core (NG Core). A radio terminal (i.e., User Equipment (UE)) capable of being connected to the 5G System is referred to as 5G UE or NextGen UE (NG UE), or simply referred to as UE. The official names of the RAT, UE, radio access network, core network, network entities (nodes), protocol layers and the like for the NG System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS. An SDF is one or more packet flows that match an SDF template (i.e., packet filters) based on a Policy and Charging Control (PCC) rule. In order to achieve packet routing, each packet to be transferred through an EPS bearer contains information for identifying which bearer (i.e., General Packet Radio Service (GPRS) Tunneling Protocol (GTP) tunnel) the packet is associated with.

In contrast, with regard to the 5G System, it is discussed that although radio bearers may be used in the 5G-RAN, no bearers are used in the 5G-CN or in the interface between the 5G-CN and the NG-RAN (see Non-Patent Literature 1). Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. That is, the 5G System adopts the Flow-based QoS (or per-flow QoS) concept instead of the Bearer-based QoS concept. In the Flow-based QoS concept, QoS is handled per PDU flow. The PDU flow is also referred to as a QoS flow accordingly. Association between a 5G UE and a data network is referred to as a "PDU session". The term "PDU session" corresponds to the term "PDN connection" in LTE and LTE-Advanced. A plurality of PDU flows (or QoS flows) can be configured in one PDU session.

It has also been suggested that the 5G System supports network slicing (see Non Patent Literature 1). Network slicing uses Network Function Virtualization (NFV) and software-defined networking (SDN) techniques and makes it possible to create a plurality of virtualized logical networks on a physical network. Each virtualized logical network is referred to as a network slice or a network slice instance, includes logical nodes and functions, and is used for specific traffic and signaling. The 5G-RAN or the 5G-CN or both have a Slice Selection Function (SSF). The SSF selects one or more network slices suitable for a 5G UE based on information provided by at least one of the 5G UE and the 5G-CN.

FIG. 1 shows a basic architecture of the 5G system. A UE establishes one or more Signalling Radio Bearers (SRBs) and one or more Data Radio Bearers (DRBs) with a gNB. The 5G-CN and the gNB establish a control plane interface and a user plane interface for the UE. The control plane interface between the 5G-CN and the gNB (i.e., RAN) is referred to as an NG2 interface or an NG-c interface and is used for transfer of Non-Access Stratum (NAS) information and for transfer of control information between the 5G-CN and the gNB. The user plane interface between the 5G-CN and the gNB (i.e., RAN) is referred to as an NG3 interface or an NG-u interface and is used for transfer of packets of one or more PDU flows (or QoS flows) in a PDU session of the UE.

Furthermore, in the 5G System, a new RRC state is introduced in addition to the existing RRC_CONNECTED and RRC_IDLE states (see, for example, Non Patent Literature 1 to 5). The new RRC state is referred to as an RRC_INACTIVE state or an RRC_INACTIVE_CONNECTED state. In order to differentiate the RRC states of the 5G system from those of Evolved Universal Terrestrial Radio Access (E-UTRA), the RRC states of the 5G system are hereinafter referred to as the "NR" RRC_CONNECTED state, the "NR" RRC_INACTIVE state and the "NR" RRC_IDLE state. Meanwhile, the RRC states of E-UTRA are hereinafter referred to as the "E-UTRA" RRC_CONNECTED state and the "E-UTRA" RRC_IDLE state.

The NR RRC_CONNECTED and NR RRC_IDLE states have features similar to those of the E-UTRA RRC_CONNECTED and E-UTRA RRC_IDLE states, respectively. When the UE is in the NR RRC_CONNECTED state, the UE and the 5G-RAN maintain an AS context, and a location of the UE is known to the 5G-RAN at cell level. Mobility of the UE in the NR RRC_CONNECTED state is handled by a handover controlled by the 5G-RAN. On the other hand, when the UE is in the NR RRC_IDLE state, the UE and the 5G-RAN have released the AS context, the location of the UE is not known to the 5G-RAN, and the location of the UE is known to the 5G-CN at location registration area level. The location registration area corresponds to a Tracking Area (TA) of LTE. Mobility of the UE in the NR RRC_IDLE state is handled by cell reselection controlled by the UE. Moreover, the RRC state of the AS layer is associated with a connection management (NG Connection Management (NG CM)) state of the NAS layer. The UE in the NR RRC_CONNECTED state is considered to be in an NG-CM-CONNECTED state in the UE and the 5G-CN. In contrast, the UE in the NR RRC_IDLE state is considered to be in an NG-CM-IDLE state in the UE and the 5G-CN.

It can be said that the NR RRC_INACTIVE state is an intermediate state between the NR RRC_CONNECTED state and the NR RRC_IDLE state. Some features of the NR RRC_INACTIVE state are similar to those of the NR RRC_CONNECTED state, while some other features of the NR RRC_INACTIVE state are similar to those of the NR RRC_IDLE state.

When the UE is in the NR RRC_INACTIVE state, the UE and the 5G-RAN maintain at least part of the AS context. The AS context held by the UE and the 5G-RAN for the UE in the NR RRC_INACTIVE state includes, for example, a radio bearer configuration and an AS security context. Further, the 5G-RAN keeps the control-plane and user-plane connections (i.e., NG2 and NG3 interfaces in FIG. 1) with the 5G-CN for the UE in the NR RRC_INACTIVE state established. The UE in the NR RRC_INACTIVE state is considered to be in the NG-CM-CONNECTED state in the UE and the 5G-CN. Accordingly, the 5G-CN does not distinguish whether the UE is in the NR RRC_CONNECTED state or the NR RRC_INACTIVE state. These features of the NR RRC_INACTIVE state are similar to those of the NR RRC_CONNECTED state.

However, the mobility of the UE in the NR RRC_INACTIVE state is similar to that of the UE in the NR RRC_IDLE state. Specifically, the mobility of the UE in the NR RRC_INACTIVE state is handled by the cell reselection controlled by the UE.

FIG. 2 shows state transitions, which are currently proposed, between the three RRC states. The UE can transition from the NR RRC_CONNECTED state to the NR RRC_INACTIVE state and vice versa (Steps 201 and 202). It is assumed that the transition between the NR RRC_CONNECTED state and the NR RRC_INACTIVE state reuses the Suspend and Resume procedures of the RRC Connection defined for LTE in 3GPP Release 13. The AS context stored in the 5G-RAN for the UE in the NR RRC_INACTIVE state may be transferred between RAN nodes (i.e., gNBs). Specifically, when the UE transitions from the NR RRC_INACTIVE state to the NR RRC_CONNECTED state, the gNB which has received an RRC message (e.g., RRC Connection Resume request) from the UE may fetch or retrieve the AS context of this UE from another gNB.

The location of the UE in the NR RRC_INACTIVE state is known to the 5G-RAN at a level of a newly defined RAN Notification Area (RNA). The RAN notification area is also referred to as a RAN-based Notification Area, a RAN paging area, or a RAN location update area. The RAN notification area (RNA) includes one or more cells, is determined by the 5G-RAN, and is configured in the UE by the 5G-RAN. Even when the UE in the NR RRC_INACTIVE state moves between cells by cell reselection within the RAN notification area, there is no need to notify (or report to) the 5G-RAN that it has performed the cell reselection. The UE in the NR RRC_INACTIVE state requests the 5G-RAN to update the RAN notification area in response to reselecting a cell outside the RAN notification area.

FIG. 3 shows an example of the mobility of the UE in the NR RRC_INACTIVE state. First, a UE 301 is in the NR RRC_CONNECTED state (321) in a cell 351 of a gNB 311 and it has been assigned dedicated radio resources from the gNB 311 and has established dedicated radio bearers 322. Upon determining to move the UE 301 into the NR RRC_INACTIVE state, the gNB 311 configures the UE 301 with a RAN notification area 340 and transmits an RRC message (e.g., RRC Suspend message) to the UE 301 (323). In response to the instruction from the gNB 311, the UE 301 enters the NR RRC_INACTIVE state from NR the RRC_CONNECTED state (324).

The UE 301 in the NR RRC_INACTIVE state performs a cell reselection procedure and accordingly reselects a cell 352 of a gNB 312 (325). Since the cell 352 is included in the RAN notification area 340 configured in the UE 301, the UE 301 does not report the cell reselection (i.e., update of UE location information) to the 5G-RAN (e.g., cell 352 or gNB 312). The UE 301 further moves and reselects a cell 353 of a gNB 313 (326). The cell 353 is not included in the RAN notification area 340 configured in the UE 301, and accordingly the UE 301 transmits a request for a RAN notification area update (327) to the gNB 313. The request (327) may be transmitted using an RRC message (e.g., RRC Resume Request message) requesting a transition from NR RRC_INACTIVE to NR RRC_CONNECTED. The gNB 313 acquires an AS context of the UE 301 from the gNB 311 and re-establishes the Packet Data Convergence Protocol (PDCP) and Radio Link Control (RLC) for radio bearers using the acquired AS context. Then, the gNB 313 transmits an RRC message (e.g., RRC resume message) to move the UE 301 to the NR RRC_CONNECTED state. In response to the instruction from the gNB 311, the UE 301 enters the NR RRC_CONNECTED state from the NR RRC_INACTIVE state in the cell 353 (329). The UE 301 is able to transmit and receive data using dedicated radio bearers 330.

There are some proposals on state transitions of a UE between the NR RRC state and the E-UTRA RRC state. For example, Non-Patent Literature 2 discloses the UE state transition diagram shown in FIG. 4. Non-Patent Literature 2 proposes that an inter-RAT handover procedure for existing RATs (legacy RATs) can be used to perform a transition between the NR RRC_CONNECTED state and the E-UTRA RRC_CONNECTED state, and that an inter-RAT cell reselection procedure for existing RATs (legacy RATs) can be used to perform a transition between the NR RRC_IDLE state and the E-UTRA RRC_IDLE state. Non-Patent Literature 2 further proposes that the inter-RAT cell reselection procedure can be used to perform a transition from the NR RRC_INACTIVE state to the E-UTRA RRC_IDLE state.

CITATION LIST

Non Patent Literature

[Non-Patent Literature 1] 3GPP TR 23.799 V14.0.0 (2016-12) "3rd Generation Partnership Project; Technical Specification Group Services and System Aspects; Study on Architecture for Next Generation System (Release 14)", December 2016

[Non-Patent Literature 2] 3GPP R2-168077, NTT DOCOMO, INC., "UE state transition diagram for NR", 3GPP TSG-RAN WG2 Meeting #96, Reno, USA 14-18 Nov. 2016

SUMMARY OF INVENTION

Technical Problem

The inventors have studied state transitions of a UE between the NR RRC state and the E-UTRA RRC state and found some problems. For example, Non-Patent Literature 2 proposes that a UE transitions to the E-UTRA RRC_IDLE state by a cell reselection procedure when the UE in the NR RRC_INACTIVE state moves from an NR cell to an E-UTRA cell. However, Non-Patent Literature 2 does not disclose explicit conditions in order for the UE to perform this state transition. Furthermore, it can be inappropriate that the UE transitions to the E-UTRA RRC_IDLE state every time the UE in the NR RRC_INACTIVE state moves to an E-UTRA cell. This is because, if the eNB providing the E-UTRA cell is an eNB enhanced for interworking (e.g., E-UTRA-NR Dual Connectivity (ENDC)) with an NG System, the eNB can be connected to the 5G-CN, and a direct inter-base-station interface between eNB and gNB can be used. In these cases, the eNB can retrieve an NR AS context regarding the UE in the NR RRC_INACTIVE state and derive the E-UTRA AS context from the retrieved NR AS context.

Accordingly, one of the objects to be attained by embodiments disclosed herein is to provide an apparatus, a method, and a program that contribute to enhancing UE state transition between NR RRC states and E-UTRA RRC states. It should be noted that this object is merely one of the objects to be attained by the embodiments disclosed herein. Other objects or problems and novel features will be made apparent from the following description and the accompanying drawings.

Solution to Problem

In a first aspect, a radio terminal includes at least one transceiver and at least one processor. The at least one processor configured to control the at least one transceiver in one or more cells of a first radio access network (RAN) and in one or more cells of a second RAN, where the first RAN supports a first Radio Access Technology (RAT) and has an interface with a first core network (CN), while the second RAN supports a second RAT. The at least one processor is configured to control state transitions of the radio terminal among an RRC_CONNECTED state of the first RAT, an RRC_INACTIVE state of the first RAT, and an RRC_IDLE state of the first RAT, and also configured to state transitions of the radio terminal between an RRC_CONNECTED state of the second RAT and an RRC_IDLE state of the second RAT. The at least one processor is further configured to, when the radio terminal in the RRC_INACTIVE state of the first RAT in the first RAN and having a Non-Access Stratum (NAS) connection with the first CN moves to a cell of the second RAN, alter an RRC state transition operation of the radio terminal depending on whether the second RAN supports interworking with at least one of the first CN and the first RAN.

In a second aspect, a base station supporting a second Radio Access Technology (RAT) includes a memory and at least one processor couple to the memory. The at least one processor is configured to transmit, in a cell of the base station, an information element used by a radio terminal to determine whether the base station supports a particular RRC state transition. The particular RRC state transition includes a state transition of the radio terminal from an RRC_INACTIVE state of a first RAT to an RRC_CONNECTED state of the second RAT.

In a third aspect, a method for a radio terminal includes: (a) controlling state transitions of the radio terminal among an RRC_CONNECTED state of the first RAT, an RRC_INACTIVE state of the first RAT, and an RRC_IDLE state of the first RAT; (b) controlling state transitions of the radio terminal between an RRC_CONNECTED state of the second RAT and an RRC_IDLE state of the second RAT; and (c) when the radio terminal in the RRC_INACTIVE state of the first RAT in the first RAN and having a Non-Access Stratum (NAS) connection with the first CN moves to a cell of the second RAN, altering an RRC state transition operation of the radio terminal depending on whether the second RAN supports interworking with at least one of the first CN and the first RAN.

In a fourth aspect, a method for a base station supporting a second Radio Access Technology (RAT) includes transmitting, in a cell of the base station, an information element used by a radio terminal to determine whether the base station supports a particular RRC state transition. The particular RRC state transition includes a state transition of the radio terminal from an RRC_INACTIVE state of a first RAT to an RRC_CONNECTED state of the second RAT.

In a fifth aspect, a program includes instructions (software codes) that, when loaded into a computer, cause the computer to perform the method according to the above-described third or fourth aspect.

Advantageous Effects of Invention

According to the above-deceived aspects, it is possible to provide an apparatus, a method, and a program that contribute to enhancing UE state transition between NR RRC states and E-UTRA RRC states.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on a 3GPP system that supports UE mobility between E-UTRA and 5G RAT. However, these embodiments may be applied to other radio communication systems supporting UE mobility among a plurality of RATs.

First Embodiment

Figure 1:
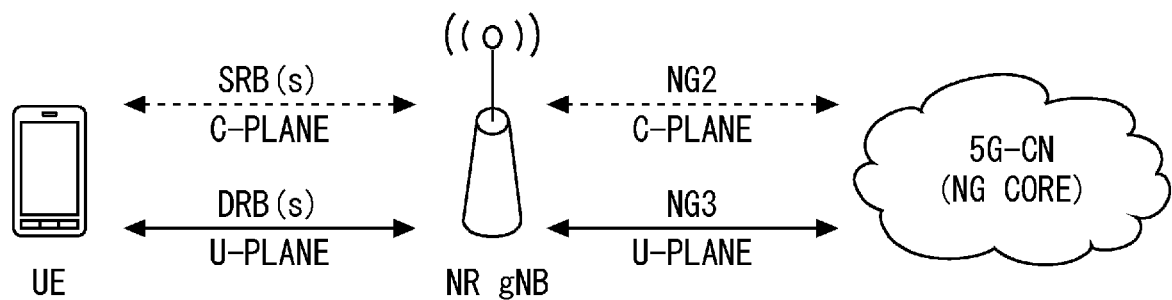
FIG. 1 is a diagram showing basic architecture of the 5G System according to the Background Art.
Figure 2:
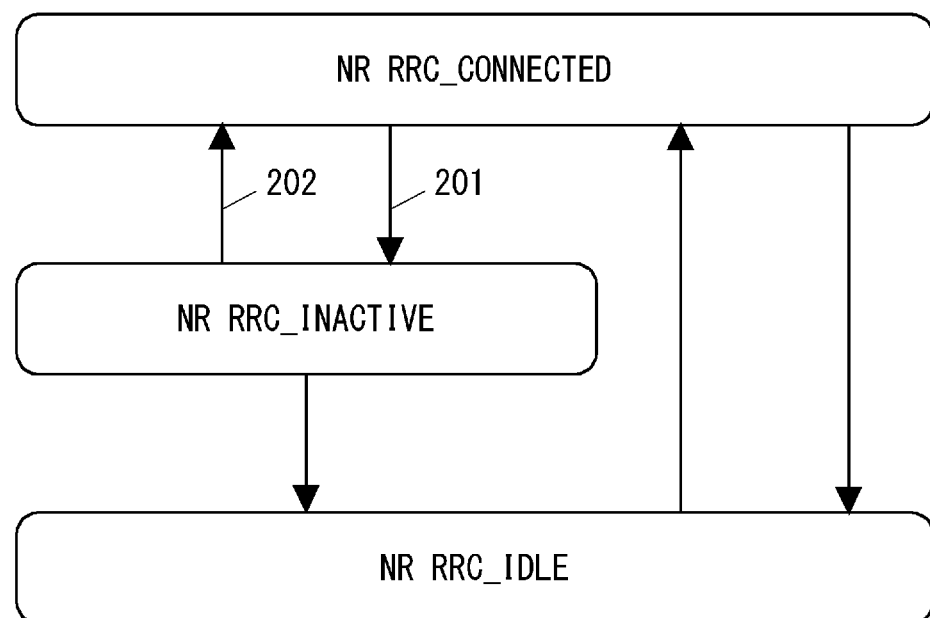
FIG. 2 is a diagram showing state transition among the three RRC states in the 5G system according to the Background Art.
Figure 3:
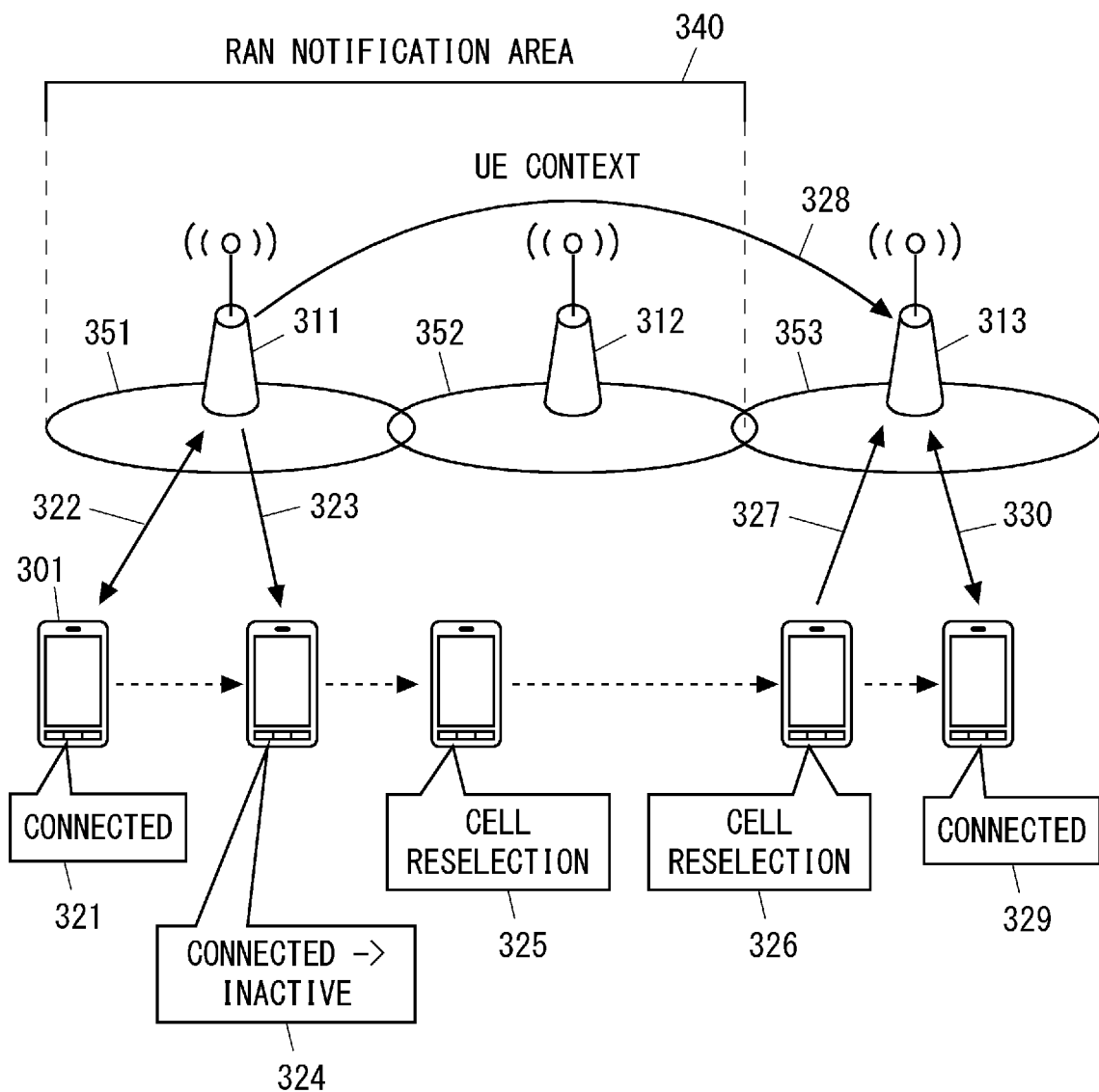
FIG. 3 is a diagram showing one example of mobility of a UE in RRC_INACTIVE state according to the Background Art.
Figure 4:
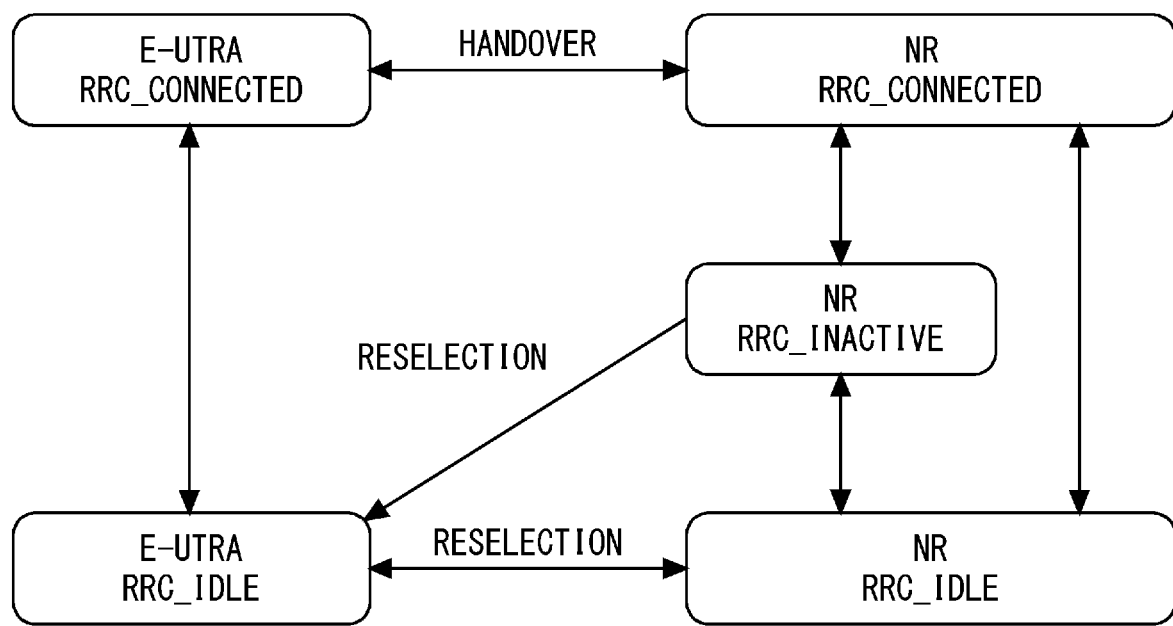
FIG. 4 is a diagram showing state transition including NR RRC states and E-UTRA RRC states according to the Background Art.
Figure 5:
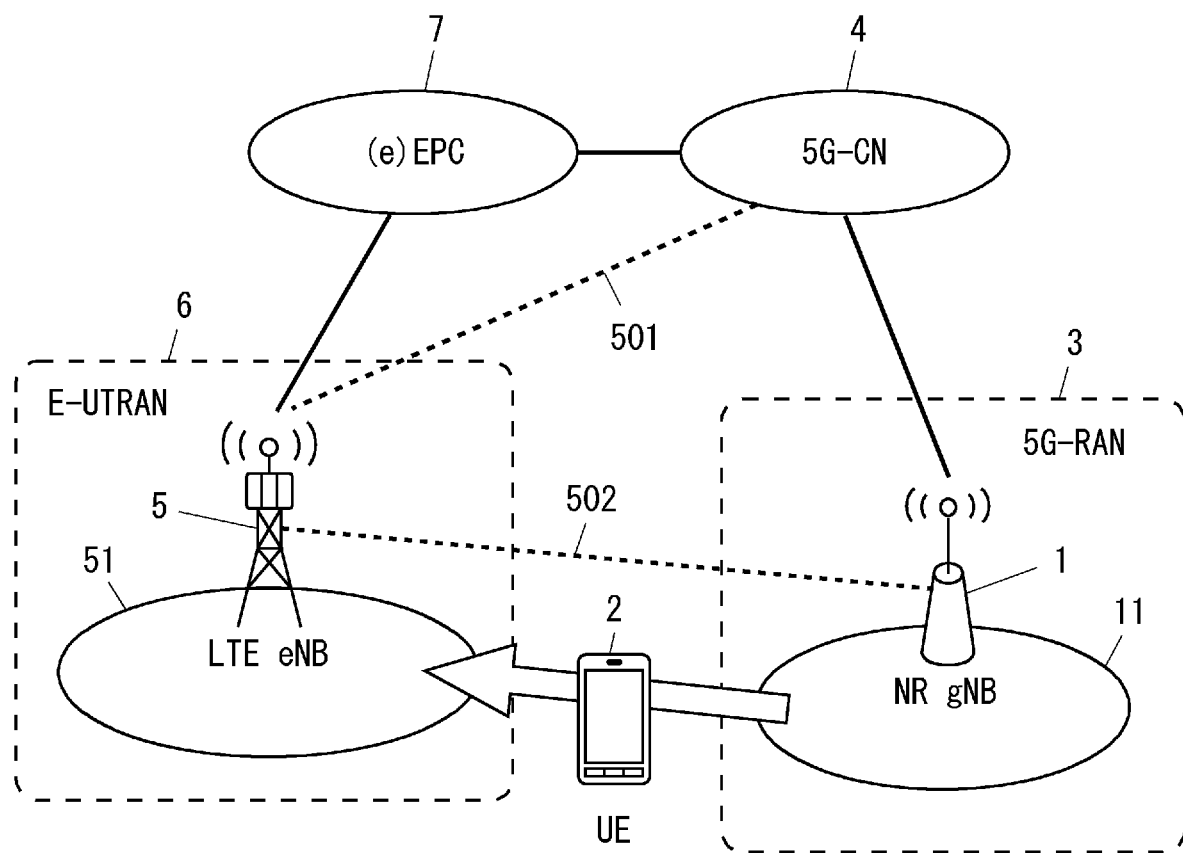
FIG. 5 is a diagram showing a configuration example of a radio communication network according to a plurality of embodiments.

FIG. 5 shows a configuration example of a radio communication network according to a plurality of embodiments including this embodiment. In the example of FIG. 5, the radio communication network includes a 5G UE 2, a 5G-RAN 3, a 5G-CN 4, an E-UTRAN 6, and an EPC 7.

The 5G-CN 4 includes Control Plane Network Functions (CP NFs) and User Plane Network Functions (UP NFs), which are not shown. The 5G-CN 4 may provide a plurality of network slices. The network slices are distinguished from one another according to, for example, services or use cases provided to UEs on each of the network slices. The use cases include, for example, enhanced Mobile Broad Band (eMBB), Ultra Reliable and Low Latency Communication (URLLC), and massive Machine Type Communication (mMTC).

The 5G-RAN 3 includes a plurality of gNBs including a gNB 1. The gNB 1 serves at least one 5G cell 11. The gNB 1 is connected to the 5G-CN 4 and communicates with a control-plane node (or CP NF(s)) in the 5g-CN 4 through a control-plane interface (e.g., NG2 interface) and with user-plane node (or UP NF(s)) in the 5g-CN 4 through a user-plane interface (e.g., NG3 interface).

The gNB 1 may support one or more network slices. In other words, one or more network slices are supported or available in the 5G cell 11 of the gNB 1. In some implementations, in order to provide end-to-end network slicing to the UE 2, the 5G-RAN 3 assigns, to the UE 2, a RAN slice and a radio slice associated with a network slice of the 5G-CN 4 (referred to as a Core Network (CN) slice) selected for the UE 2. Each RAN slice provides storage and processing resources of the infrastructures within the 5G-RAN 3 including the gNB 1. Each radio slice provides radio resources including time resources, frequency resources, code resources, signal sequence resources, or spatial resources, or any combination thereof.

In the example of FIG. 5, the EPC 7 is connected to the 5G-CN 4. Specifically, one or more nodes in the EPC 7 are connected to one or more nodes in the 5G-CN 4 through a control-plane interface. In some implementations, the MME in the EPC 7 may communicate with a control-plane node (or CP NF(s)) in the 5G-CN 4 through a control-plane interface. In addition, one or more nodes in the EPC 7 may communicate with a user-plane node (or UP NF(s)) in the 5G-CN 4 through a user-plane interface. That is, the EPC 7 is enhanced to perform interworking with the 5G System including the 5G-CN 4, and may be referred to as an eEPC.

The E-UTRAN 6 includes a plurality of eNBs including the eNB 5. The LTE eNB 5 manages at least one E-UTRA (LTE) cell 51. The eNB 5 is connected to the EPC 7, communicates with a control-plane node (e.g., an MME) in the EPC 7 through a control-plane interface (e.g., an S1-MME interface), and communicates with a user-plane node (e.g., an S-GW) in the EPC 7 through a user-plane interface (e.g., an S1-U interface).

The eNB 5 may be further connected to the 5G-CN 4. In other words, the eNB 5 may have an interface 501 with the 5G-CN 4. That is, the eNB 5 may communicate with a control-plane node (or CP NF(s)) in the 5G-CN 4 through a control-plane interface (e.g., an NG2 interface) and with a user-plane node (or UP NF(s)) in the 5G-CN 4 through a user-plane interface (e.g., an NG3 interface). The eNB 5 may be enhanced to be connected to the 5G-CN 4 in this manner and be referred to as an eLTE eNB. In some implementations, the 5G-CN 4 may set up a virtualized network slice (CN slice) that provides logical EPC nodes and EPC functions. In some implementations, both the E-UTRAN 6 including the LTE eNB 5 and the 5G-RAN 3 including the gNB 1 may be connected to the same CN slice. Alternatively, the E-UTRAN 6 and the 5G-RAN 3 may be connected to a different CN slice from each other.

The LTE eNB 5 may be connected to the gNB 1 by a direct inter-base-station interface 502 (e.g., an X3 interface). The direct inter-base-station interface 502 may be used for signaling between the eNB 5 and the gNB 1, or user packet transferring therebetween, or both. However, the direct inter-base-station interface 502 between the eNB 5 and the gNB 1 may not be provided.

The UE 2 supports both E-UTRA (i.e., LTE RAT) and 5G RAT. The UE 2 has the capability of being connected to the LTE system including the E-UTRAN 6 and the EPC 7 (i.e., E-UTRA-EPC-connected) and of being connected to the 5G system including the 5G-RAN 3 and the 5G-CN 4 (i.e., NR-5G-CN-connected). In addition, when the E-UTRAN 6 is connected to the 5G-CN 4, the UE 2 has the capability of being connected to the 5G-CN 4 through the E-UTRAN 6 (i.e., E-UTRA-5G-CN-connected).

The UE 2 is configured to operate in cells of the 5G-RAN 3 supporting the 5G RAT. The UE 2 uses one or more 5G cells 11 served by one or more gNBs 1 to perform uplink and downlink communication. The UE 2 supports a plurality of NR RRC states including the NR RRC_CONNECTED state, the NR RRC_INACTIVE state, and the NR RRC_IDLE state. The 5G-RAN 3 (gNB 1) and the UE 2 control state transitions of the UE 2 among the NR RRC states including the NR RRC_CONNECTED, NR RRC_INACTIVE, and NR RRC_IDLE states.

For example, when the gNB 1 moves the UE 2 from the NR RRC_CONNECTED state to the NR RRC_INACTIVE state, it transmits, to the UE 2, RAN notification area information via an RRC message (e.g., RRC Connection Release, RRC Connection Suspend, or RRC Connection Deactivate) to configure the RAN notification area in the UE 2. The RAN notification area includes one or more cells served by one or more gNBs 1. The UE 2 enters the NR RRC_INACTIVE state in response to receiving the RRC message from the gNB 1. The UE 2 in the NR RRC_INACTIVE state moves between cells by cell reselection controlled by the UE 2, and does not need to report the cell reselection (i.e., update of UE location information) within the RAN notification area to the 5G-RAN 3. In contrast, in response to reselecting a 5G cell outside the configured RAN notification area, the UE 2 requests a gNB serving the reselected 5G cell to update the RAN notification area (or notify the gNB 1B that it has left the configured RAN notification area). The gNB serving the reselected 5G cell determines a new RAN notification area for the UE 2, and configures the determined RAN notification area in the UE 2. That is, as described above, the location of the UE 2 in the NR RRC_INACTIVE state is known to the 5G-RAN 3 at RAN notification area level.

As already described, the RAN notification area (RNA) includes one or more cells, is determined by the 5G-RAN 3, and is configured in the UE 2 by the 5G-RAN 3. The RAN notification area is also referred to as a RAN-based Notification Area, a RAN paging area, or a RAN location update area.

The RAN notification area information may include at least, for example, information indicating which cell is included in the RAN notification area. In addition, the RAN notification area may be assigned an identifier (e.g., area number). Furthermore, the relationship between an identifier of the RAN notification area (e.g., RNA ID) and the cell(s) contained therein may be determined uniquely within a predetermined area. In this case, the RAN notification area information may include an identifier of the RAN notification area and information regarding the contained cell(s) (e.g., cell identifier(s)).

The gNB 1A may broadcast the RAN notification area information in its cell 11A. At this time, the RAN notification area information may include information relating to a plurality of RAN notification areas, they may be assigned their respective conditions (e.g., category, type), and the UE 2 may select one RAN notification area suitable for the UE 2. The condition is, for example, a slice category or slice type (e.g., Slice/Service Type (SST)) of a network slice used (or desired) by the UE 2, a terminal category or terminal type, reception quality at the UE 2 or a coverage level based thereon, mobility characteristics of the UE 2 (e.g., UE speed, whether it is a stationary terminal), or any combination thereof.

The RAN notification area configured in the UE 2 may be the same as the location registration area of the UE 2 (i.e., area corresponding to the Tracking Area (TA) in LTE). When each individual RAN notification area (i.e., Slice specific RNA) is configured for each network slice, at least one of the RAN notification areas may be the same as the location registration area (e.g., TA). When the RNA is the same as the TA, an information element (e.g., RanAreaCellList Information Element (IE)) indicating a cell list included in this RNA may be omitted from the RAN notification area information transmitted from the gNB 1 to the UE 2 (that is, an Optional IE). Alternatively, the RAN notification area information may include an information element (e.g., TrackingAreaCode IE) indicating a TA identifier instead of the information element indicating the cell list (that is, Choice). In other words, the gNB 1 may select one of the RanAreaCellList IE and the TrackingAreaCode IE to indicate the RAN notification area.

In order to transmit the RAN notification area information including information relating to the plurality of RAN notification areas, the gNB 1A may receive RAN notification area information (e.g., combination of the identifier of a RAN notification area and the identifiers of cells constituting this RAN notification area) from another gNB (e.g., gNB 1B) through an inter-gNB interface (Xn). The other gNB may manage a cell belonging to another RAN notification area different from that to which the cell (e.g., cell 11A) of the gNB 1A belongs. Likewise, the RAN notification area-related information received from the other gNB may relate to another RAN notification area different from that to which the cell (e.g., cell 11A) of the gNB 1A belongs.

When the UE 2 uses (or desires) a plurality of network slices, it may select one RAN notification area based on the network slice having the highest priority or based on the network slice that is actually being used. Alternatively, the UE 2 may select one RAN notification area based on the network slice that is high on the list of network slice categories or types contained in the RAN notification area information.

The above-described RAN notification area information may include a RAN notification area (e.g., default RAN notification area) whose individual information (e.g., identifier, category, or type) is not explicitly specified. In this case, for example, the default RAN notification area may be used for the UE 2 regardless of the network slice, or may be used for network slices other than those explicitly indicated in the RAN notification area information. Furthermore, when the RAN notification area information includes a plurality of RAN notification areas, the UE 2 may not need to transmit to the gNB 1 a request for updating its location information as long as the cell after the cell reselection is included in at least one of the RAN notification areas.

Instead of the above-described instruction via the RRC message, the gNB 1 may notify the UE 2 about a value of a predetermined timer which triggers the transition to the RRC_INACTIVE state, to cause the UE 2 to execute the transition to the RRC_INACTIVE state based on the timer value and the corresponding timer. For example, the UE 2 in the RRC_CONNECTED state may restart the timer (i.e., reset the timer and start it again) each time it transmits or receives user data, and may transition to the RRC_INACTIVE state when the timer expires.

The UE 2 is configured to operate in cells of the E-UTRAN 6 supporting the E-UTRA. The UE 2 uses one or more E-UTRA cells 51 served by one or more eNBs 5 to perform uplink and downlink communication. The UE 2 supports the E-UTRA RRC_CONNECTED state and the E-UTRA RRC_IDLE state. The E-UTRAN 6 (eNB 5) and the UE 2 control state transitions of the UE 2 between the E-UTRA RRC_CONNECTED and E-UTRA RRC_IDLE states.

The following describes UE state transitions between the NR RRC states and the E-UTRA RRC states. The UE 2 (e.g., a controller in the UE 2) according to the present embodiment is configured to, when the UE 2 in the NR RRC_INACTIVE state in the 5G-RAN 3 and having a Non-Access Stratum (NAS) connection with the 5G-CN 4 moves to the cell 51 of the E-UTRAN 6, alter the RRC state transition operation of the UE 2 depending on whether or not the E-UTRAN 6 has an interface with at least one of the 5G-CN 4 and the 5G-RAN 3 (i.e., the interface 501, the interface 502, or both). Note that, the UE 2 having a Non-Access Stratum (NAS) connection with the 5G-CN 4 corresponds to the NG-CM-CONNECTED state. In other words, the UE 2 is configured to, when the UE 2 in the NR RRC_INACTIVE state in the 5G-RAN 3 moves to the cell 51 of the E-UTRAN 6, alter the RRC state transition operation of the UE 2 depending on whether the E-UTRA cell 51 (or the eNB 5 managing the E-UTRA cell 51) supports interworking (e.g., E-UTRA-NR Dual Connectivity (ENDC)) with the 5G system (i.e., the 5G-CN, the 5G-RAN 3, or both).

Here, the E-UTRA cell 51 (or the eNB 5) supporting interworking with the 5G system means, for example, that the E-UTRA cell 51 (or the eNB 5) has at least one function of Multi-Connectivity (e.g., Dual Connectivity), seamless mobility (e.g., handover), and fetching/retrieving of a UE AS context, between the LTE system and the 5G system for the UE 2, or that the E-UTRA is capable of providing these functions to the UE 2.

Specifically, the UE 2 may perform state transitions as described below. When the UE 2 moves to the cell 51 of the E-UTRAN 6 and if the E-UTRAN 6 has an interface with at least one of the 5G-CN 4 and the 5G-RAN 3, the UE 2 (e.g., the controller in the UE 2) transitions the UE 2 from the NR RRC_INACTIVE state to the E-UTRA RRC_CONNECTED state (e.g., an E-UTRA-EPC-connected mode or an E-UTRA-5G-CN-connected mode). In other words, if the eNB 5 managing the cell 51 has an interface with at least one of the 5G-CN 4 and the 5G-RAN 3, the UE 2 attempts to transition from the NR RRC_INACTIVE state to the E-UTRA RRC_CONNECTED state.

When the UE 2 moves to the cell 51 of the E-UTRAN 6 and if the E-UTRAN 6 has no interface with the 5G-CN 4 or the 5G-RAN 3, the UE 2 (e.g., the controller in the UE 2) transitions the UE 2 from the NR RRC_INACTIVE state to the E-UTRA RRC_IDLE state (e.g., an E-UTRA-EPC-idle mode or an E-UTRA-5G-CN-idle mode). In other words, if the eNB 5 managing the cell 51 has no interface with the 5G-CN 4 or the 5G-RAN 3, the UE 2 attempts to transition from the NR RRC_INACTIVE state to the E-UTRA RRC_IDLE state.

The above-described processing of the controller in the UE 2 may be performed by the AS layer (e.g., an RRC sublayer) of the UE 2. In addition, the processing of the controller may be performed by a plurality of sublayers (e.g., RRC, PDCP, RLC, and MAC sublayers) in the AS layer. Furthermore, in the inter-RAT mobility of the UE 2 from NR to E-UTRA, the AS layer of the UE 2 needs to send a notification to the NAS layer of the UE 2. That is, the above-described processing of the controller in the UE 2 may be performed by the AS and NAS layers of the UE 2.

For example, when the AS layer of the UE 2 performs a transition from the NR RRC_INACTIVE state to the E-UTRA RRC_CONNECTED state, it may send to the NAS layer of the UE 2 a notification that indicates (or requests) switching from NR to E-UTRA. On the other hand, when the AS layer of the UE 2 performs a transition from the NR RRC_INACTIVE state to the E-UTRA RRC_IDLE state, it may send to the NAS layer of the UE 2 a notification that indicates (or requests) release of the NR UE Context.

Figure 6:
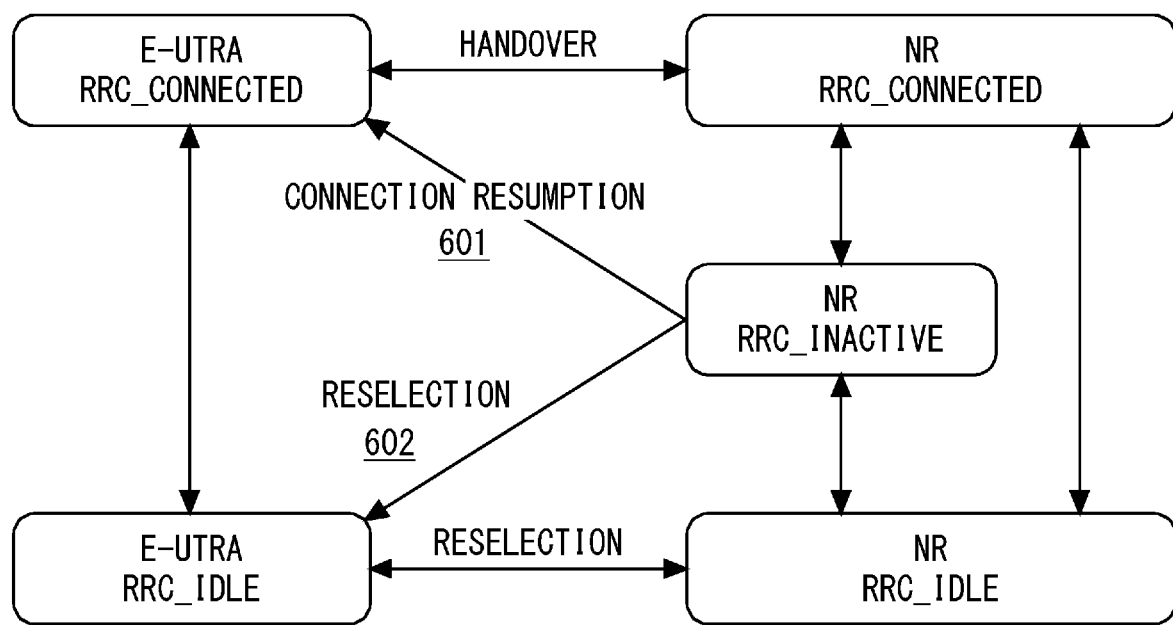
FIG. 6 is a flowchart showing one example of RRC state transition according to a first embodiment.

FIG. 6 is a diagram showing an example of the RRC state transitions of the UE 2. When the UE 2 in the NR RRC_INACTIVE state in the 5G-RAN 3 moves to the cell 51 of the E-UTRAN 6 and if the E-UTRA cell 51 or the eNB 5 managing the E-UTRA cell 51 supports the interworking with the 5G system (i.e., the 5G-CN 4, the 5G-RAN 3, or both), the UE 2 attempts to enter the E-UTRA RRC_CONNECTED state by an RRC connection resumption procedure (601). On the other hand, if the E-UTRA cell 51 or the eNB 5 managing the E-UTRA cell 51 does not support the interworking with the 5G system (i.e., the 5G-CN 4, the 5G-RAN 3, or both), the UE 2 attempts to enter the E-UTRA RRC_IDLE state by a cell reselection procedure (602).

Note that, the E-UTRA RRC_CONNECTED state may include a first sub-state (or mode) in which a full RRC connection is maintained, and a second sub-state (or mode) in which a lightweight RRC connection as compared to the full RRC connection is maintained for signaling reduction. The second sub-state is referred to as, for example, a lightly connected mode. The state transition in Step 601 in FIG. 6 may be a transition from the NR RRC_INACTIVE state to the second sub-state within the E-UTRA RRC_CONNECTED state.

Figure 7:
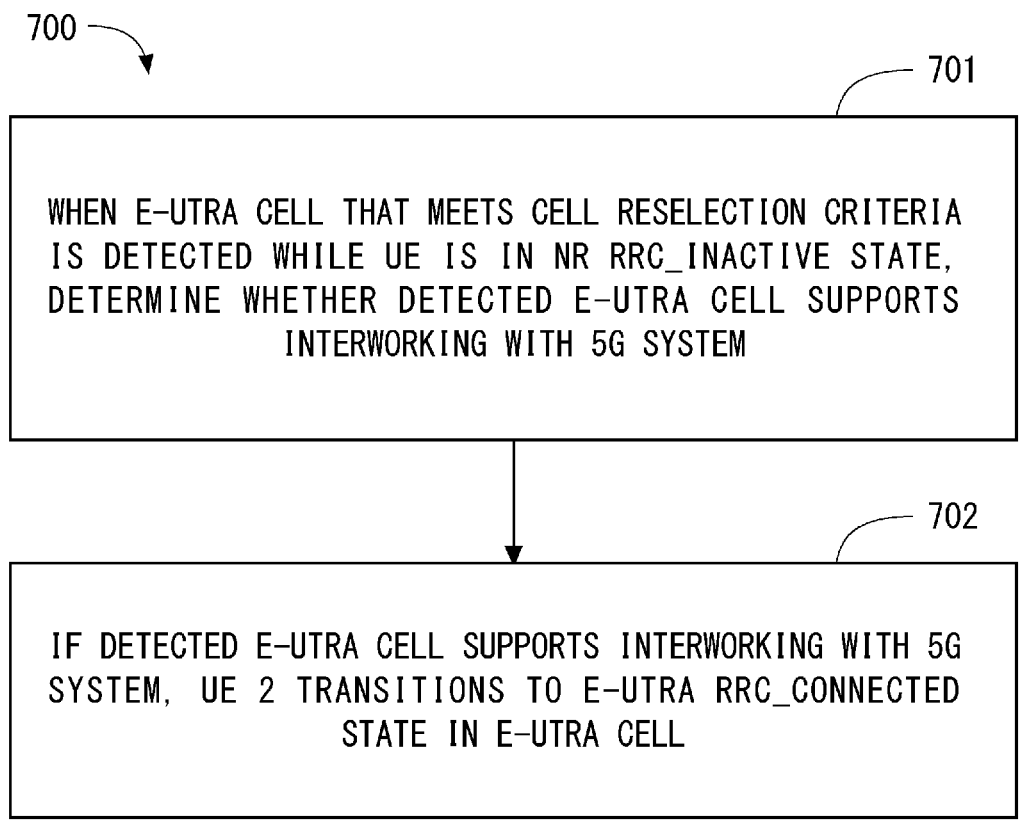
FIG. 7 is a flowchart showing an example of an operation of a UE according to the first embodiment.

FIG. 7 is a flowchart showing a process 700 that is an example of an operation of the UE 2. In Step 701, when the UE 2 detects an E-UTRA cell that meets cell reselection criteria while the UE 2 is in the NR RRC_INACTIVE state, it determines whether the detected E-UTRA cell 51 supports the interworking with the 5G system. If the detected E-UTRA cell 51 supports the interworking with the 5G system, the UE 2 attempts to transition to the E-UTRA RRC_CONNECTED state in this E-UTRA cell 51 (Step 702).

In the determination of Step 701, the UE 2 may determine whether the detected E-UTRA cell 51 is served by the eNB 5 having an interface(s) with one or both of the 5G-CN 4 and the 5G-RAN 3. For example, the UE 2 may receive a predetermined information element transmitted from the eNB 5 in the E-UTRA cell 51 to determine whether or not the E-UTRA cell 51 or the eNB 5 supports a particular RRC state transition. Here, the particular RRC state transition includes the state transition from the NR RRC_INACTIVE state to the E-UTRA RRC_CONNECTED state.

This information element may explicitly or implicitly indicate whether the 5G support is provided in the E-UTRA cell 51. In other words, the information element may explicitly or implicitly indicate that the particular RRC state transition is supported. Additionally or alternatively, the information element may explicitly or implicitly indicate whether the eNB 5 has an interface with at least one of the 5G-RAN 3 and the 5G-CN 4 (or, whether the eNB 5 supports the interworking with the 5G system (i.e., the 5G-CN 4, the 5G-RAN 3, or both)). In some implementations, the information element may be transmitted in system information. Alternatively, the information element may be embedded in a cell identifier. This enables the UE 2 to determine whether the 5G support is provided in the cell 51 only by receiving the cell identifier of the cell 51. Alternatively, the information element may be a Non-Access Stratum (NAS) information element included in system information. For example, the AS layer of the UE 2 may send this NAS information element to the NAS layer, and the NAS layer may perform processing necessary for inter-RAT cell reselection in response to receiving the information.

Figure 8:
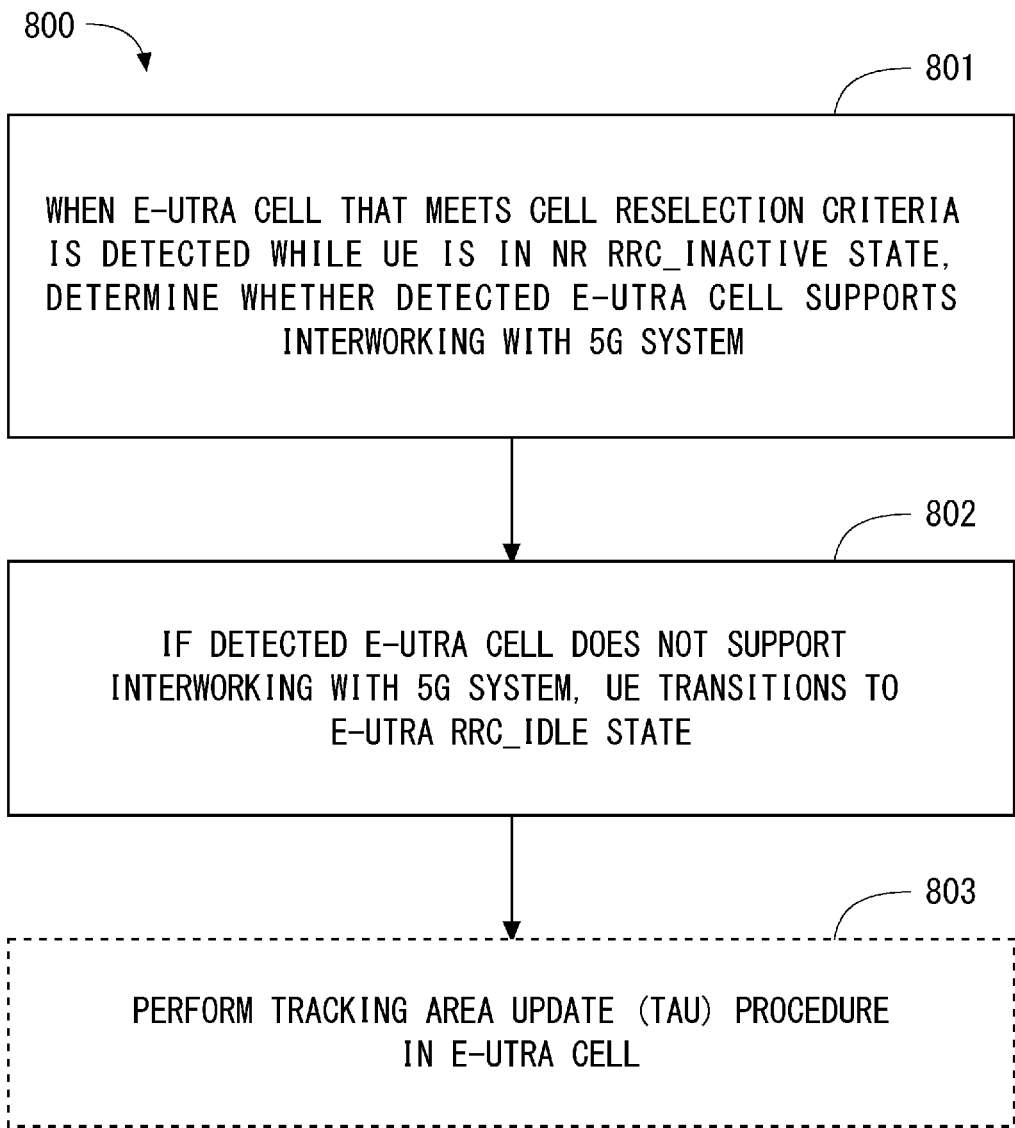
FIG. 8 is a flowchart showing an example of an operation of a UE according to the first embodiment.

FIG. 8 is a flowchart showing a process 800 that is an example of an operation of the UE 2. The processing in Step 801 is similar to that in Step 701 in FIG. 7. Specifically, in Step 801, when the UE 2 detects an E-UTRA cell that meets cell reselection criteria while the UE 2 is in the NR RRC_INACTIVE state, it determines whether the detected E-UTRA cell 51 supports the interworking with the 5G system. If the detected E-UTRA cell 51 does not support the interworking with the 5G system, the UE 2 attempts to transition to the E-UTRA RRC_IDLE state (Step 802).

After transitioning to the E-UTRA RRC_IDLE state, the UE 2 may perform a location update procedure (i.e., a Tracking Area Update (TAU) procedure) to the EPC 7 through the E-UTRAN 6. Note that, as regards the cell reselection between UTRA and E-UTRA, there is known "Idle mode Signalling Reduction (ISR)" for reducing signaling in the location registration processing. When the ISR is activated, the UE has been registered in both two mobility managing entities corresponding to UTRA and E-UTRA (i.e., the Serving GPRS Support Node (SGSN) and the MME). When the ISR is activated, the UE can perform reselection between the UTRAN and the E-UTRAN without performing a location registration process (i.e., RA Update (RAU) or TAU) unless the UE moves outside the two location registration areas registered in the network (i.e., the Routing Area (RA) and the Tracking Area(s) (TA(s))). In order to perform reselection between the E-UTRAN 6 and the 5G-RAN 3, that is, reselection between the EPC 7 and the 5G-CN 4 and between the E-UTRAN 6 and the 5G-RAN 3 under the control of the 5G-CN 4, the ISR may be introduced. In this case, Step 803 may be omitted.

Figure 9:
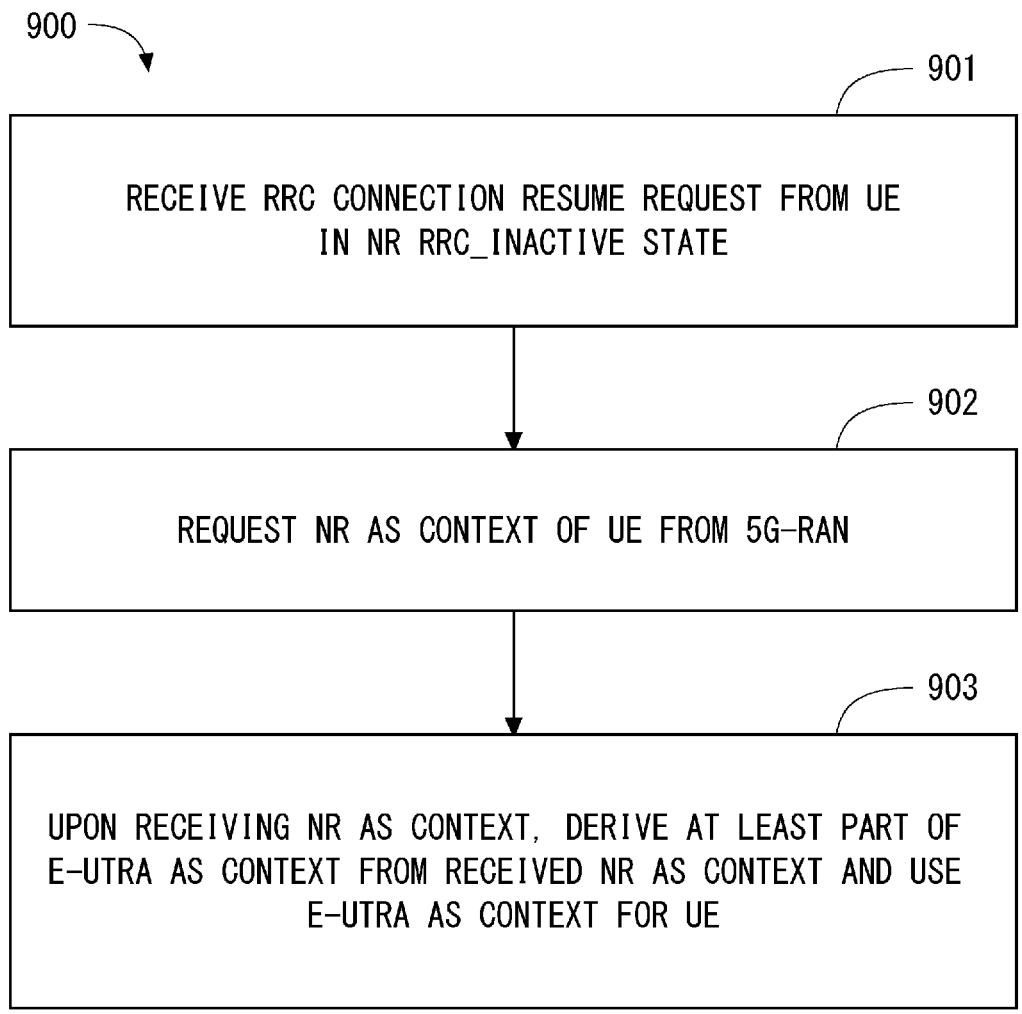
FIG. 9 is a flowchart showing an example of an operation of an LTE eNB according to the first embodiment.

FIG. 9 is a flowchart showing a process 900 that is an example of an operation of the eNB 5. In Step 901, the eNB 5 receives an RRC connection resume request from the UE 2 in the NR RRC_INACTIVE state. In order to perform Inter-RAT RRC Connection Resume from NR to E-UTRA, a new RRC message (e.g., RRCConnectionResumeRequest-NR, or RRCConnectionResumeRequest-InterRAT (IRAT)) may be defined. Additionally or alternatively, the RRC connection resume request may include mobility information indicating that it is the Inter-RAT RRC Connection Resume from NR to E-UTRA. The mobility information may include, for example, at least one of: information indicating that an RRC connection resume cause is transition from the NR RRC_INACTIVE state to the E-UTRA RRC_CONNECTED state (e.g., interRAT-mobility, inter-RAT-resume, or resumeFromNR); information about the NR cell in which the transition to the NR RRC_INACTIVE state was performed (e.g., a cell identifier, or a career frequency); and information about the RAN notification area. Note that, a resume ID used in the E-UTRA (LTE) has a length of 40 bits, and accordingly a resume ID allocated to a UE in the NR RRC_INACTIVE state may also have a length of 40 bits. Alternatively, when the length of a NR resume ID is longer than 40 bits, the UE 2 may derive a truncated resume ID having a length of 40 bits from the NR resume ID and transmit it to the eNB 5 via the RRC connection resume request.

In Step 902, in response to receiving the RRC connection resume request, the eNB 5 requests an NR AS context of the UE 2 from the 5G-RAN 3. Upon receiving the NR AS context of the UE 2, the eNB 5 derives at least part of an E-UTRA AS context from the NR AS context and uses the E-UTRA AS context for the UE 2 (Step 903). Thus, the eNB 5 allows the UE 2 to transition from the NR RRC_INACTIVE state to the E-UTRA RRC_CONNECTED state.

Note that, in the case of the inter-RAT mobility from NR to E-UTRA, the RRC connection resume procedure cannot be used directly. For example, the UE 2 needs to perform reconfiguration of its layer 2 including an AS security configuration (e.g., PDCP re-establishment, RLC re-establishment, or MAC reset), that is, the layer 2 needs to be reconfigured as the layer 2 of the E-UTRA. Thus, the eNB 5 may respond to the RRC connection resume request from the UE 2 with an RRC Connection Setup. That is, the eNB 5 may transmit radio resource configuration information necessary for establishing a new E-UTRA RRC connection to the UE 2. In response to this, the UE 2 completes establishment of the RRC connection and notifies the eNB 5 of the establishment (e.g., RRC Connection Setup Complete). Alternatively, the UE 2 may transmit the RRC Connection Resume Request to the eNB 5 using a default configuration of the E-UTRA layer 2 (or an L2 configuration defined for inter-RAT resume).

Figure 10:
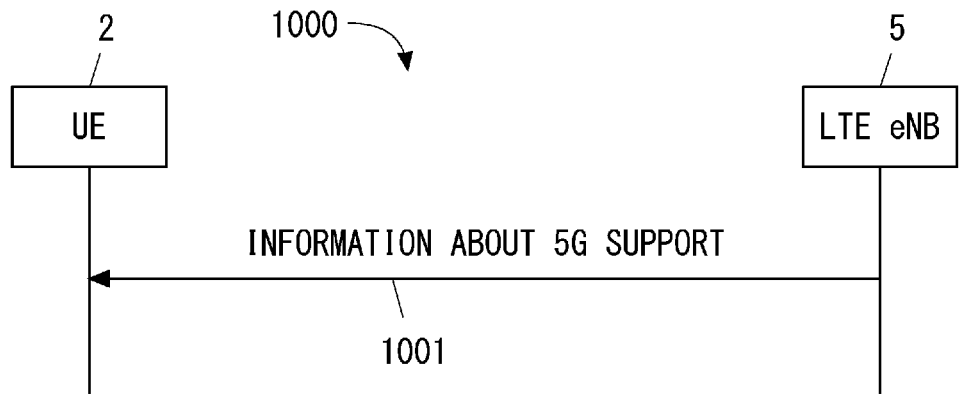
FIG. 10 is a sequence diagram showing an example of operations of an LTE eNB and a UE according to the first embodiment.
Figure 11:
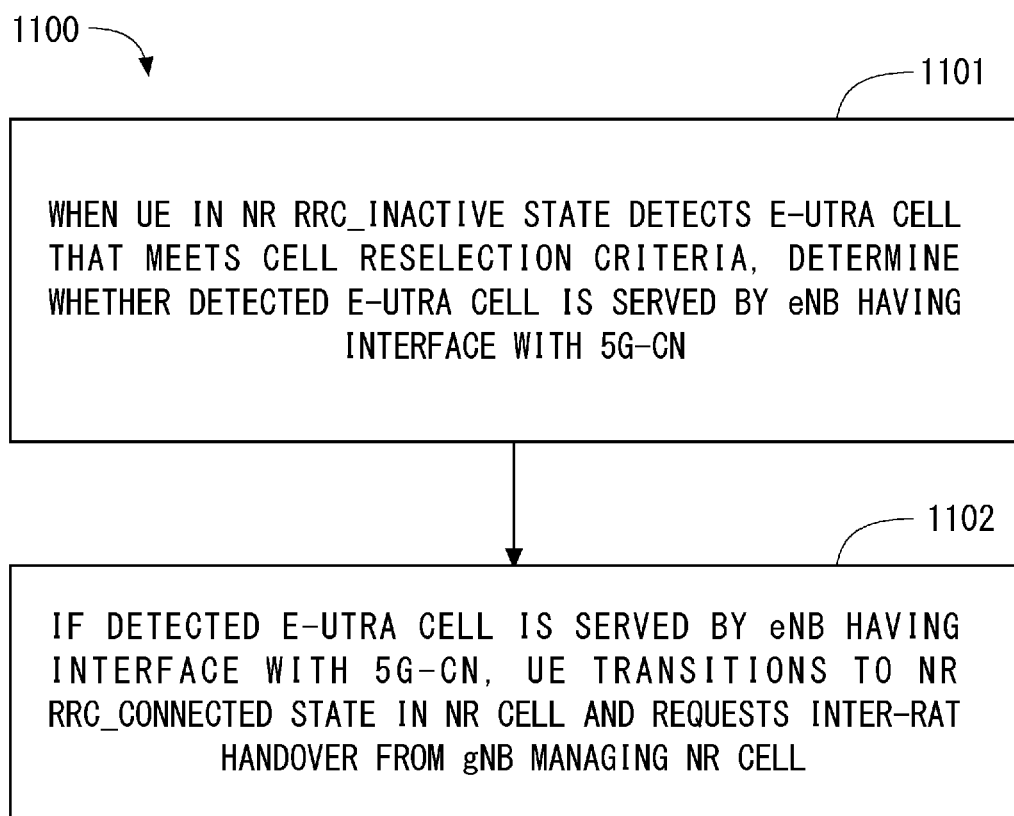
FIG. 11 is a flowchart showing an example of an operation of a UE according to a second embodiment.

FIG. 10 is a sequence diagram showing a process 1000 that is an example of an operation of the eNB 5. In Step 1001, the eNB 5 transmits an information element about the 5G support to the UE 2. This information element may indicate whether the interworking with the 5G system (i.e., the 5G-CN 4, the 5G-RAN 3, or both) is provided in the E-UTRA cell 51. As described above, in some implementations, the information element may be embedded in a cell identifier. This enables the UE 2 to determine whether the 5G support is provided in the cell 51 only by receiving the cell identifier of the cell 51. Alternatively, the information element may be an NAS information element included in system information. According to this example, the eNB 5 thus allows the UE 2 to determine whether the interworking with the 5G system is supported in the E-UTRA cell 51. In other words, the eNB 5 allows the UE 2 to determine whether the transition from the NR RRC_INACTIVE state to the E-UTRA RRC_CONNECTED state is usable (or allowed) in the E-UTRA cell 51.

As can be understood from the above description, in the present embodiment, when the UE 2 in the NR RRC_INACTIVE state in the 5G-RAN 3 and having the Non-Access Stratum (NAS) connection with the 5G-CN 4 moves to the cell 51 of the E-UTRAN 6, the UE 2 alters its RRC state transition operation depending on whether the E-UTRAN 6 has an interface with at least one of the 5G-CN 4 and the 5G-RAN 3 (i.e., the interface 501, the interface 502, or both). This enables the UE 2 to optimize its state transitions between the NR RRC state and the E-UTRA RRC state. Thus, the present embodiment contributes improvement of the UE state transitions between the NR RRC state and the E-UTRA RRC state.

Second Embodiment

The present embodiment provides a modification of the operation of the UE 2 described in the first embodiment. A configuration example of a radio communication network in the present embodiment is similar to that in FIG. 5.

In this embodiment, when the UE 2 in the NR RRC_INACTIVE state in the 5G-RAN 3 and having a Non-Access Stratum (NAS) connection with the 5G-CN 4 moves to the cell 51 of the E-UTRAN 6, the UE 2 (e.g., the controller in the UE 2) determines whether or not the E-UTRA cell 51 or the eNB 5 managing the E-UTRA cell 51 supports (or provides) interworking with the 5G system (i.e., the 5G-CN 4, the 5G-RAN 3, or both).

The UE 2 may determine whether or not the E-UTRA cell 51 or the eNB 5 supports the interworking depending on, for example, whether system information transmitted from the eNB 5 in the E-UTRA cell 51 includes information about the support of the interworking (e.g., multi-connectivity support, inter-RAT seamless mobility support, or UE context fetch/retrieve support). Alternatively, the UE 2 may determine whether or not the E-UTRA cell 51 or the eNB 5 supports the interworking depending on whether system information transmitted from the eNB 5 in the E-UTRA cell 51 includes information about the 5G-CN 4 (e.g., an identifier of a node (NF) in the 5G-CN 4). Additionally or alternatively, information about E-UTRA cells 51 (e.g., cell identifiers) that supports (or provides) the interworking may be transmitted to the UE 2 in cells of the 5G-RAN 3 via system information or dedicated signaling (e.g., dedicated RRC). The UE 2 may determine whether or not the E-UTRA cell 51 or the eNB 5 supports the interworking based on this information about E-UTRA cells 51 supporting the interworking, that is, depending on whether a target E-UTRA cell 51 of cell reselection is included in the cells supporting (or providing) the interworking.

If the E-UTRA cell 51 or the eNB 5 supports the interworking with the 5G system, the UE 2 enters from the NR RRC_INACTIVE state to the NR RRC_CONNECTED state and then enters the E-UTRA RRC_CONNECTED state by an inter-RAT handover procedure. If the E-UTRA cell 51 or the eNB 5 does not support the interworking with the 5G system, the UE 2 enters the E-UTRA RRC_IDLE state by a cell reselection procedure. This enables the UE 2 to optimize the state transitions of the UE 2 between the NR RRC states and the E-UTRA RRC states. Thus, the present embodiment contributes improvement of the UE state transitions between the NR RRC states and the E-UTRA RRC states.

Figure 12:
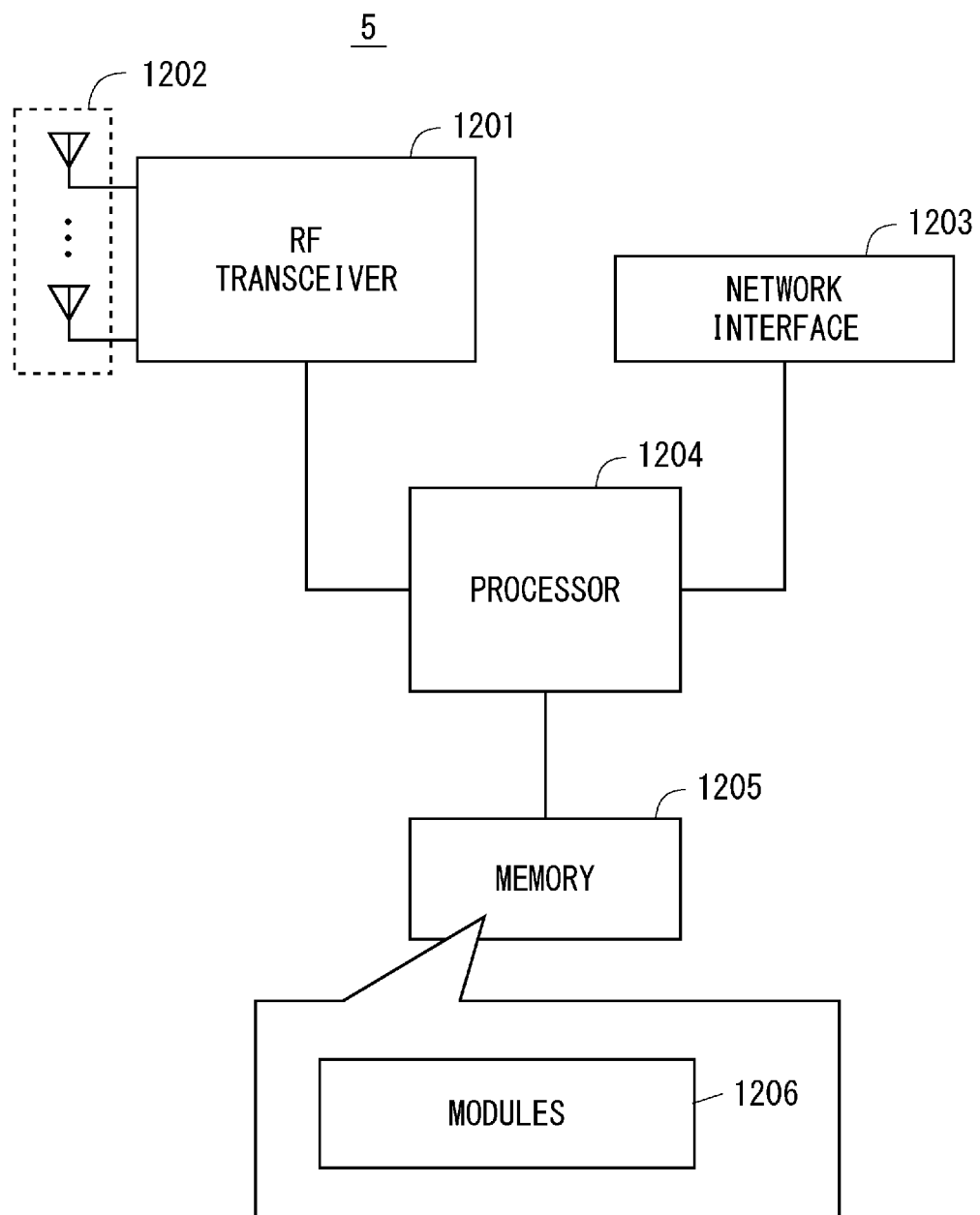
FIG. 12 is a block diagram showing a configuration example of an LTE eNB according to a plurality of embodiments.

The following provides configuration examples of the gNB 1, the UE 2, and the eNB 5 according to the above embodiments. FIG. 12 is a block diagram showing a configuration example of the eNB 5 according to the above embodiments. The configuration of the gNB 2 may be similar to that shown in FIG. 12. Referring to FIG. 12, the eNB 5 includes a Radio Frequency transceiver 1201, a network interface 1203, a processor 1204, and a memory 1205. The RF transceiver 1201 performs analog RF signal processing to communicate with NG UEs including the UE 2. The RF transceiver 1201 may include a plurality of transceivers. The RF transceiver 1201 is coupled to an antenna array 1202 and the processor 1204. The RF transceiver 1201 receives modulated symbol data from the processor 1204, generates a transmission RF signal, and supplies the transmission RF signal to the antenna array 1202. Further, the RF transceiver 1201 generates a baseband reception signal based on a reception RF signal received by the antenna array 1202 and supplies the baseband reception signal to the processor 1204. The RF transceiver 1201 may include an analog beamformer circuit for beam forming. The analog beamformer circuit includes, for example, a plurality of phase shifters and a plurality of power amplifiers.

The network interface 1203 is used to communicate with network nodes (e.g., a control node and a transfer node in the 5G-CN 4). The network interface 1203 may include, for example, a network interface card (NIC) conforming to the IEEE 802.3 series.

The processor 1204 performs digital baseband signal processing (i.e., data-plane processing) and control-plane processing for radio communication. The processor 1204 may include a plurality of processors. The processor 1204 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 1204 may include a digital beamformer module for beam forming. The digital beamformer module may include a Multiple Input Multiple Output (MIMO) encoder and a pre-coder.

The memory 1205 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1205 may include a storage located apart from the processor 1204. In this case, the processor 1204 may access the memory 1205 via the network interface 1203 or an I/O interface (not shown).

The memory 1205 may store one or more software modules (computer programs) 1206 including instructions and data to perform processing by the eNB 5 described in the above embodiments. In some implementations, the processor 1204 may be configured to load the software modules 1206 from the memory 1205 and execute the loaded software modules, thereby performing processing of the eNB 5 described in the above embodiments.

Figure 13:
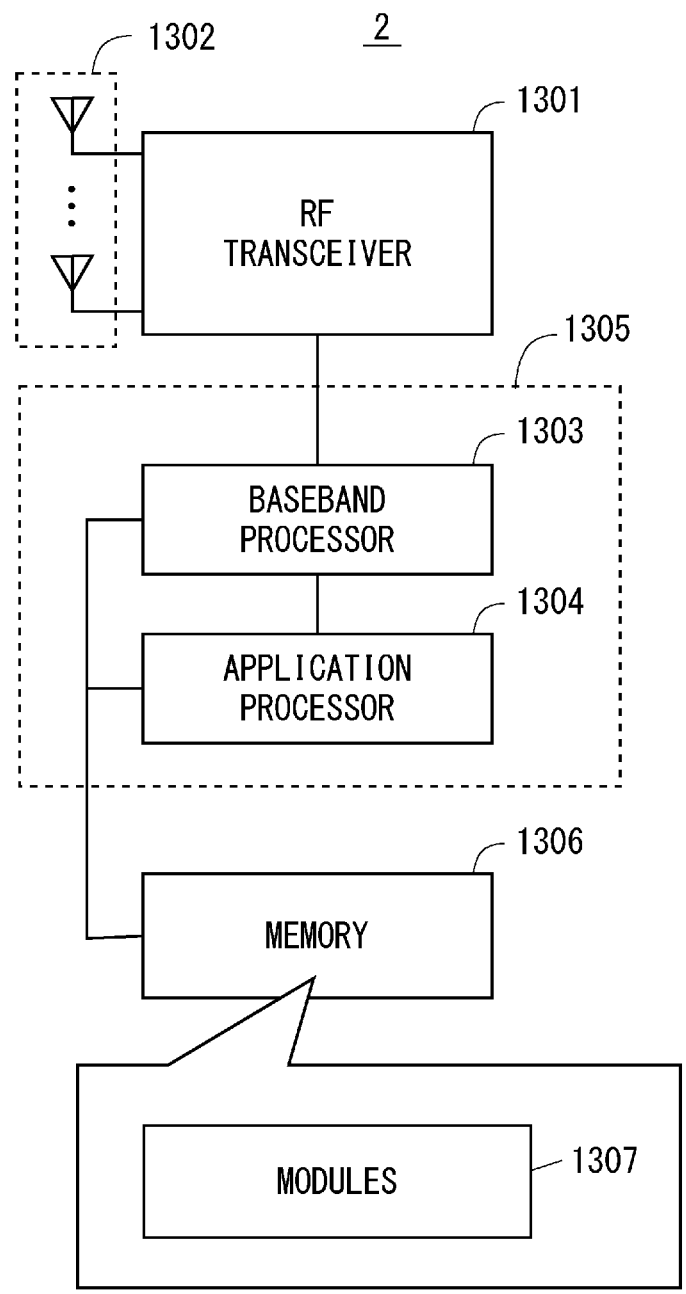
FIG. 13 is a block diagram showing a configuration example of a UE according to a plurality of embodiments.

FIG. 13 is a block diagram showing a configuration example of the UE 2. A Radio Frequency (RF) transceiver 1301 performs analog RF signal processing to communicate with the gNB 1. The RF transceiver 1301 may include a plurality of transceivers. The analog RF signal processing performed by the RF transceiver 1301 includes frequency up-conversion, frequency down-conversion, and amplification. The RF transceiver 1301 is coupled to an antenna array 1302 and a baseband processor 1303. The RF transceiver 1301 receives modulated symbol data (or OFDM symbol data) from the baseband processor 1303, generates a transmission RF signal, and supplies the transmission RF signal to the antenna array 1302. Further, the RF transceiver 1301 generates a baseband reception signal based on a reception RF signal received by the antenna array 1302 and supplies the baseband reception signal to the baseband processor 1303. The RF transceiver 1301 may include an analog beamformer circuit for beam forming. The analog beamformer circuit includes, for example, a plurality of phase shifters and a plurality of power amplifiers.

The baseband processor 1303 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1303 may include, for example, signal processing of a Packet Data Convergence Protocol (PDCP) layer, a Radio Link Control (RLC) layer, a MAC layer, and a PHY layer. Further, the control-plane processing performed by the baseband processor 1303 may include processing of a Non-Access Stratum (NAS) protocol, an RRC protocol, and MAC CEs.

The baseband processor 1203 may perform MIMO encoding and pre-coding for beam forming.

The baseband processor 1303 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1304 described in the following.

The application processor 1304 is also referred to as a CPU, an MPU, a microprocessor, or a processor core. The application processor 1304 may include a plurality of processors (processor cores). The application processor 1304 loads a system software program (Operating System (OS)) and various application programs (e.g., a call application, a WEB browser, a mailer, a camera operation application, and a music player application) from a memory 1306 or from another memory (not shown) and executes these programs, thereby providing various functions of the UE 2.

In some implementations, as represented by a dashed line (1305) in FIG. 13, the baseband processor 1303 and the application processor 1304 may be integrated on a single chip. In other words, the baseband processor 1303 and the application processor 1304 may be implemented in a single System on Chip (SoC) device 1305. An SoC device may be referred to as a system Large Scale Integration (LSI) or a chipset.

The memory 1306 is a volatile memory, a non-volatile memory, or a combination thereof. The memory 1306 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 1306 may include, for example, an external memory device that can be accessed from the baseband processor 1303, the application processor 1304, and the SoC 1305. The memory 1306 may include an internal memory device that is integrated in the baseband processor 1303, the application processor 1304, or the SoC 1305. Further, the memory 1306 may include a memory in a Universal Integrated Circuit Card (UICC).

The memory 1306 may store one or more software modules (computer programs) 1307 including instructions and data to perform the processing by the UE 2 described in the above embodiments. In some implementations, the baseband processor 1303 or the application processor 1304 may load these software modules 1307 from the memory 1306 and execute the loaded software modules, thereby performing the processing of the UE 2 described in the above embodiments with reference to the drawings.

As described above with reference to FIGS. 12 and 13, each of the processors included in the gNB 1, the UE 2, and the eNB 5 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The 5G-RAN 3 and the E-UTRAN 6 described in the above embodiments may be implemented based on a Cloud Radio Access Network (C-RAN) concept. The C-RAN is also referred to as a Centralized RAN. In this case, processes and operations performed by each of the gNB 1 and the eNB 5 described in the above embodiments may be provided by a Digital Unit (DU) included in the C-RAN architecture, or by a combination of a DU and a Radio Unit (RU). The DU is also referred to as a Baseband Unit (BBU) or a Central Unit (CU). The RU is also referred to as a Remote Radio Head (RRH), a Remote Radio Equipment (RRE), a Distributed Unit (DU), or a Transmission and Reception Point (TRP or TR×P). That is, processes and operations performed by each of the gNB 1 and the eNB 5 described in the above embodiments may be provided by one or more radio stations (or RAN nodes).

In the above embodiments, the UE 2 is further configured to alter its RRC state transition operation based on one or more network slices that had been configured in (or allowed for or permitted for) the UE 2 by the network (i.e., the 5G-CN 4, the 5G-RAN 3, or both) when the UE 2 was in the RRC_CONNECTED state. For example, the UE 2 may perform the state transition from the NR RRC_INACTIVE state to the E-UTRA RRC_CONNECTED state if it had been allowed, permitted, or configured with a predetermined network slice (or slice category or slice type (e.g., Slice/Service Type (SST)), or it perform the state transition from the NR RRC_INACTIVE state to the E-UTRA RRC_IDLE state if not.

Alternatively, when the UE 2 had been allowed, permitted, or configured with one or more network slices, and when the state transition from the NR RRC_INACTIVE state to the E-UTRA RRC_CONNECTED state is allowed for at least one of those network slices, the UE 2 may perform this state transition. Alternatively, when the state transition from the NR RRC_INACTIVE state to the E-UTRA RRC_CONNECTED state is allowed for all the previously configured, allowed, or permitted network slices, the UE 2 may perform this state transition. The UE 2 performs a procedure for resuming data radio bearers (DRBs) corresponding to the network slice for which the state transition from the NR RRC_INACTIVE state to the E-UTRA RRC_CONNECTED state is allowed. In addition, the UE 2 may release (or discard) the configurations of data radio bearers (e.g., radio bearer configurations) corresponding to the other previously configured network slices. In this case, the AS layer of the UE 2 may notify the NAS layer of the UE 2 of the information about the resumed data radio bearers and the released (or discarded) data radio bearers.

The NAS layer of the UE 2 may perform a procedure necessary for inter-RAT mobility in response to the notification.

Here, information indicating whether the state transition from the NR RRC_INACTIVE state to the E-UTRA RRC_CONNECTED state is allowed for a predetermined network slice (or the network slice that the UE 2 had been allowed, permitted, or configured with) may be sent by the gNB 1 to the UE 2 via system information or dedicated signaling. Additionally or alternatively, this information may be included in system information transmitted from the eNB 5 in the target E-UTRA cell 51 after the cell reselection. Specifically, the UE 2 may determine, based on the information transmitted in the target E-UTRA cell 51 of the cell reselection, whether the state transition from the NR RRC_INACTIVE state to the E-UTRA RRC_CONNECTED state is allowed in the E-UTRA cell 51.

Further, the above-described embodiments are merely examples of applications of the technical ideas obtained by the inventors. These technical ideas are not limited to the above-described embodiments and various modifications may be made thereto.

For example, the whole or part of the above embodiments can be described as, but not limited to, the following supplementary notes.

(Supplementary Note 1)

A radio terminal comprising:

at least one transceiver; and at least one processor configured to control the at least one transceiver in one or more cells of a first radio access network (RAN) and in one or more cells of a second RAN, the first RAN supporting a first Radio Access Technology (RAT) and having an interface with a first core network (CN), the second RAN supporting a second RAT, wherein the at least one processor is configured to control state transitions of the radio terminal among an RRC_CONNECTED state of the first RAT, an RRC_INACTIVE state of the first RAT, and an RRC_IDLE state of the first RAT, the at least one processor is configured to control state transitions of the radio terminal between an RRC_CONNECTED state of the second RAT and an RRC_IDLE state of the second RAT, and the at least one processor is configured to, when the radio terminal in the RRC_INACTIVE state of the first RAT in the first RAN and having a Non-Access Stratum (NAS) connection with the first CN moves to a cell of the second RAN, alter an RRC state transition operation of the radio terminal depending on whether the second RAN supports interworking with at least one of the first CN and the first RAN.

(Supplementary Note 2)

The radio terminal according to Supplementary Note 1, wherein the at least one processor is configured to, if the second RAN supports interworking with at least one of the first CN and the first RAN, transition the radio terminal from the RRC_INACTIVE state of the first RAT to the RRC_CONNECTED state of the second RAT.

(Supplementary Note 3)

The radio terminal according to Supplementary Note 2, wherein the RRC_CONNECTED state of the second RAT includes a first sub-state where a full RRC connection is maintained and a second sub-state where a lightweight RRC connection as compared to the full RRC connection is maintained to reduce signaling, and the at least one processor is configured to transition the radio terminal from the RRC_INACTIVE state of the first RAT to the second sub-state within the RRC_CONNECTED state of the second RAT.

(Supplementary Note 4)

The radio terminal according to Supplementary Note 1, wherein the at least one processor is configured to, if the second RAN supports interworking with both the first CN and the first RAN, transition the radio terminal from the RRC_INACTIVE state of the first RAT to the RRC_CONNECTED state of the first RAT and then transition the radio terminal from the RRC_CONNECTED state of the first RAT to the RRC_CONNECTED state of the second RAT.

(Supplementary Note 5)

The radio terminal according to any one of Supplementary Notes 1 to 4, wherein the at least one processor is configured to, if the second RAN supports interworking with neither the first CN nor the first RAN, transition the radio terminal from the RRC_INACTIVE state of the first RAT to the RRC_IDLE state of the second RAT.

(Supplementary Note 6)

The radio terminal according to Supplementary Note 5, wherein the at least one processor is configured to transition the radio terminal to the RRC_IDLE state of the second RAT and then perform a location update procedure to a second CN through the second RAN.

(Supplementary Note 7)

The radio terminal according to any one of Supplementary Notes 1 to 6, wherein the RRC_CONNECTED state of the first RAT is a state in which the radio terminal and the first RAN maintain a first access stratum (AS) context regarding the first RAT and in which a location of the radio terminal is known to the first RAN at cell level, the RRC_INACTIVE state of the first RAT is a state in which the radio terminal and the first RAN maintain at least part of the first AS context and in which the location of the radio terminal is known to the first RAN at RAN notification area level configured by the first RAN, the RRC_IDLE state of the first RAT is a state in which the radio terminal and the first RAN have released the first AS context and in which the location of the radio terminal is not known to the first RAN, the RRC_CONNECTED state of the second RAT is a state in which the radio terminal and the second RAN maintain a second AS context regarding the second RAT and in which the location of the radio terminal is known to the second RAN at cell level, and the RRC_IDLE state of the second RAT is a state in which the radio terminal and the second RAN have released the second AS context and in which the location of the radio terminal is not known to the second RAN.

(Supplementary Note 8)

The radio terminal according to Supplementary Note 7, wherein the RAN notification area is an area where, when the radio terminal in the RRC_INACTIVE state of the first RAT moves between cells by cell reselection, the radio terminal does not need to notify the first RAN of the cell reselection.

(Supplementary Note 9)

The radio terminal according to any one of Supplementary Notes 1 to 8, wherein the first RAT is a 5G RAT, and the second RAT is an LTE RAT.

(Supplementary Note 10)

A base station supporting a second Radio Access Technology (RAT), the base station comprising:

a memory; and at least one processor configured to transmit, in a cell of the base station, an information element used by a radio terminal to determine whether the base station supports a particular RRC state transition, wherein the particular RRC state transition includes a state transition of the radio terminal from an RRC_INACTIVE state of a first RAT to an RRC_CONNECTED state of the second RAT.

(Supplementary Note 11)

The base station according to Supplementary Note 10, wherein the information element is embedded in an identifier of the cell.

(Supplementary Note 12)

The base station according to Supplementary Note 10, wherein the information element is a Non-Access Stratum (NAS) information element included in system information.

(Supplementary Note 13)

The base station according to any one of Supplementary Notes 10 to 12, wherein the information element indicates whether the base station supports interworking with at least one of a first radio access network (RAN) associated with the first RAT and a first core network (CN) associated with the first RAT.

(Supplementary Note 14)

The base station according to any one of Supplementary Notes 10 to 13, wherein the at least one processor is configured to, upon receiving from the radio terminal in the RRC_INACTIVE state of the first RAT a request for transition to the RRC_CONNECTED state of the second RAT, attempt to retrieve an access stratum (AS) context of the radio terminal regarding the first RAT from a first RAN supporting the first RAT.

(Supplementary Note 15)

A method for a radio terminal configured to operate in cells of a first radio access network (RAN) and cells of a second RAN, the first RAN supporting a first Radio Access Technology (RAT) and having an interface with a first core network (CN), the second RAN supporting a second RAT, the method comprising:

controlling state transitions of the radio terminal among an RRC_CONNECTED state of the first RAT, an RRC_INACTIVE state of the first RAT, and an RRC_IDLE state of the first RAT;

controlling state transitions of the radio terminal between an RRC_CONNECTED state of the second RAT and an RRC_IDLE state of the second RAT; and when the radio terminal in the RRC_INACTIVE state of the first RAT in the first RAN and having a Non-Access Stratum (NAS) connection with the first CN moves to a cell of the second RAN, altering an RRC state transition operation of the radio terminal depending on whether the second RAN supports interworking with at least one of the first CN and the first RAN.

(Supplementary Note 16)

A method for a base station supporting a second Radio Access Technology (RAT), the method comprising:

transmitting, in a cell of the base station, an information element used by a radio terminal to determine whether the base station supports a particular RRC state transition, wherein the particular RRC state transition includes a state transition of the radio terminal from an RRC_INACTIVE state of a first RAT to an RRC_CONNECTED state of the second RAT.

(Supplementary Note 17)

A program for causing a computer to perform a method for a radio terminal configured to operate in cells of a first radio access network (RAN) and cells of a second RAN, the first RAN supporting a first Radio Access Technology (RAT) and having an interface with a first core network (CN), the second RAN supporting a second RAT, wherein the method comprises:

controlling state transitions of the radio terminal among an RRC_CONNECTED state of the first RAT, an RRC_INACTIVE state of the first RAT, and an RRC_IDLE state of the first RAT;

controlling state transitions of the radio terminal between an RRC_CONNECTED state of the second RAT and an RRC_IDLE state of the second RAT; and when the radio terminal in the RRC_INACTIVE state of the first RAT in the first RAN and having a Non-Access Stratum (NAS) connection with the first CN moves to a cell of the second RAN, altering an RRC state transition operation of the radio terminal depending on whether the second RAN supports interworking with at least one of the first CN and the first RAN.

(Supplementary Note 18)

A program for causing a computer to perform a base station supporting a second Radio Access Technology (RAT), wherein the method comprises:

transmitting, in a cell of the base station, an information element used by a radio terminal to determine whether the base station supports a particular RRC state transition, wherein the particular RRC state transition includes a state transition of the radio terminal from an RRC_INACTIVE state of a first RAT to an RRC_CONNECTED state of the second RAT.

REFERENCE SIGNS LIST 1 gNodeB (gNB)
2 User Equipment (UE)
3 5G Radio Access Network (5G-RAN)
4 5G Core Network (5G-CN)
5 eNodeB (eNB)
6 Evolved Universal Terrestrial Radio Access Network (E-UTRAN)
7 Evolved Packet Core (EPC)
11 Cell
1201 RF Transceiver
1204 Processor
1205 Memory
1301 RF Transceiver
1303 Baseband Processor
1304 Application Processor
1306 Memory

The invention claimed is:

1. A radio terminal comprising:

at least one transceiver; and at least one processor configured to control the at least one transceiver in one or more cells of a first radio access network (RAN) and in one or more cells of a second RAN, the first RAN supporting a first Radio Access Technology (RAT) and having an interface with a first core network (CN), the second RAN supporting a second RAT, wherein the at least one processor is configured to control state transitions of the radio terminal among an RRC_CONNECTED state of the first RAT, an RRC_INACTIVE state of the first RAT, and an RRC_IDLE state of the first RAT, wherein the at least one processor is configured to control state transitions of the radio terminal between an RRC_CONNECTED state of the second RAT and an RRC_IDLE state of the second RAT, wherein the at least one processor is configured to, if the radio terminal in the RRC_INACTIVE state of the first RAT in the first RAN and having a Non-Access Stratum (NAS) connection with the first CN moves to a cell of the second RAN, alter an RRC state transition operation of the radio terminal depending on whether the second RAN supports interworking with at least one of the first CN and the first RAN, wherein the at least one processor is configured to, if the second RAN supports interworking with at least one of the first CN and the first RAN, then transition the radio terminal to the RRC_CONNECTED state of the second RAT directly from the RRC_INACTIVE state of the first RAT, wherein the RRC_INACTIVE state of the first RAT is not a sub-state of the RRC_IDLE state of the first RAT, and wherein the RRC_INACTIVE state of the first RAT is not a sub-state of the RRC_CONNECTED state of the first RAT.

2. The radio terminal according to claim 1, wherein the RRC_CONNECTED state of the second RAT includes a first sub-state where a full RRC connection is maintained and a second sub-state where a lightweight RRC connection as compared to the full RRC connection is maintained to reduce signaling, and wherein the at least one processor is configured to transition the radio terminal from the RRC_INACTIVE state of the first RAT to the second sub-state within the RRC_CONNECTED state of the second RAT.

3. The radio terminal according to claim 1, wherein the at least one processor is configured to, if the second RAN supports interworking with neither the first CN nor the first RAN, transition the radio terminal from the RRC_INACTIVE state of the first RAT to the RRC_IDLE state of the second RAT.

4. The radio terminal according to claim 3, wherein the at least one processor is configured to transition the radio terminal to the RRC_IDLE state of the second RAT and then perform a location update procedure to a second CN through the second RAN.

5. The radio terminal according to claim 1, wherein the RRC_CONNECTED state of the first RAT is a state in which the radio terminal and the first RAN maintain a first access stratum (AS) context regarding the first RAT and in which a location of the radio terminal is known to the first RAN at cell level, wherein the RRC_INACTIVE state of the first RAT is a state in which the radio terminal and the first RAN maintain at least part of the first AS context and in which the location of the radio terminal is known to the first RAN at RAN notification area level configured by the first RAN, wherein the RRC_IDLE state of the first RAT is a state in which the radio terminal and the first RAN have released the first AS context and in which the location of the radio terminal is not known to the first RAN, wherein the RRC_CONNECTED state of the second RAT is a state in which the radio terminal and the second RAN maintain a second AS context regarding the second RAT and in which the location of the radio terminal is known to the second RAN at cell level, and wherein the RRC_IDLE state of the second RAT is a state in which the radio terminal and the second RAN have released the second AS context and in which the location of the radio terminal is not known to the second RAN.

6. The radio terminal according to claim 5, wherein the RAN notification area is an area where, if the radio terminal in the RRC_INACTIVE state of the first RAT moves between cells by cell reselection, the radio terminal does not need to notify the first RAN of the cell reselection.

7. The radio terminal according to claim 1, wherein the first RAT is a 5G RAT, and wherein the second RAT is an LTE RAT.

8. A base station supporting a second Radio Access Technology (RAT), the base station comprising:

a memory; and at least one processor configured to transmit, in a cell of the base station, an information element used by a radio terminal to determine whether the base station supports a particular RRC state transition, wherein the particular RRC state transition includes a state transition of the radio terminal directly from an RRC_INACTIVE state of a first RAT to an RRC_CONNECTED state of the second RAT, wherein the RRC_INACTIVE state of the first RAT is not a sub-state of an RRC_IDLE state of the first RAT, and wherein the RRC_INACTIVE state of the first RAT is not a sub-state of a RRC_CONNECTED state of the first RAT.

9. The base station according to claim 8, wherein the information element is embedded in an identifier of the cell.

10. The base station according to claim 8, wherein the information element is a Non-Access Stratum (NAS) information element included in system information.

11. The base station according to claim 8, wherein the information element indicates whether the base station supports interworking with at least one of a first radio access network (RAN) associated with the first RAT and a first core network (CN) associated with the first RAT.

12. The base station according to claim 8, wherein the at least one processor is configured to, upon receiving from the radio terminal in the RRC_INACTIVE state of the first RAT a request for transition to the RRC_CONNECTED state of the second RAT, attempt to retrieve an access stratum (AS) context of the radio terminal regarding the first RAT from a first RAN supporting the first RAT.

13. A method for a radio terminal configured to operate in cells of a first radio access network (RAN) and cells of a second RAN, the first RAN supporting a first Radio Access Technology (RAT) and having an interface with a first core network (CN), the second RAN supporting a second RAT, the method comprising:

controlling state transitions of the radio terminal among an RRC_CONNECTED state of the first RAT, an RRC_INACTIVE state of the first RAT, and an RRC_IDLE state of the first RAT;

controlling state transitions of the radio terminal between an RRC_CONNECTED state of the second RAT and an RRC_IDLE state of the second RAT; and if the radio terminal in the RRC_INACTIVE state of the first RAT in the first RAN and having a Non-Access Stratum (NAS) connection with the first CN moves to a cell of the second RAN, altering an RRC state transition operation of the radio terminal depending on whether the second RAN supports interworking with at least one of the first CN and the first RAN, wherein said altering comprises, if the second RAN supports interworking with at least one of the first CN and the first RAN, then transitioning the radio terminal to the RRC_CONNECTED state of the second RAT directly from the RRC_INACTIVE state of the first RAT, wherein the RRC_INACTIVE state of the first RAT is not a sub-state of the RRC_IDLE state of the first RAT, and wherein the RRC_INACTIVE state of the first RAT is not a sub-state of the RRC_CONNECTED state of the first RAT.

* * * * *